(12) United States Patent
Ran et al.

(10) Patent No.: US 11,795,111 B2
(45) Date of Patent: Oct. 24, 2023

(54) ELECTRO-CONDUCTIVE $B_4C$-$TIB_2$ COMPOSITE CERAMIC AND PREPARATION METHOD THEREOF

(71) Applicant: Anhui University of Technology, Ma'anshan (CN)

(72) Inventors: Songlin Ran, Ma'anshan (CN); Jun Zhao, Ma'anshan (CN); Xing Jin, Ma'anshan (CN); Dong Wang, Ma'anshan (CN); Xiang Ding, Ma'anshan (CN)

(73) Assignee: Anhui University of Technology, Ma'anshan (CN)

( * ) Notice: Subject to any disclaimer, the term of this patent is extended or adjusted under 35 U.S.C. 154(b) by 0 days.

(21) Appl. No.: 18/301,214

(22) Filed: Apr. 15, 2023

(65) Prior Publication Data

US 2023/0271886 A1    Aug. 31, 2023

(30) Foreign Application Priority Data

May 6, 2022 (CN) .......................... 202210485924.X

(51) Int. Cl.
*C04B 35/563* (2006.01)
*C04B 35/645* (2006.01)
(Continued)

(52) U.S. Cl.
CPC ...... *C04B 35/563* (2013.01); *C04B 35/58071* (2013.01); *C04B 35/62605* (2013.01);
(Continued)

(58) Field of Classification Search
CPC ........................ C04B 35/563; C04B 35/58071
See application file for complete search history.

(56) References Cited

U.S. PATENT DOCUMENTS

| 8,128,861 B1 | 3/2012 | Aghajanian |
| 8,409,491 B1 | 4/2013 | Stackpoole |

(Continued)

FOREIGN PATENT DOCUMENTS

| CN | 108118178 A | 6/2018 |
| CN | 108484171 A | 9/2018 |

(Continued)

OTHER PUBLICATIONS

Donglou Ren et al., "Synthesis and properties of conductive B4C Ceramic composites with TiB2 grain network", Journal of the American Ceramic Society, 2018, p. 5.

(Continued)

*Primary Examiner* — Karl E Group

(57) ABSTRACT

An electro-conductive $B_4C$—$TiB_2$ has a microstructure in which large $B_4C$ grains are coated by small $TiB_2$ grains. The composite ceramic includes 10~30% by volume of $TiB_2$. A method for preparing the electro-conductive $B_4C$—$TiB_2$ composite ceramic includes: (1) weighing $B_4C$, TiC, and amorphous B powder; (2) mixing evenly and drying thoroughly the powders; and (3) loading the mixed powder into a graphite mold; and placing the graphite mold in a spark plasma sintering furnace for sintering under vacuum, where the sintering is performed at 2000° C. and 50 MPa for 5~20 min.

3 Claims, 2 Drawing Sheets

(51) Int. Cl.
*C04B 35/626* (2006.01)
*C04B 35/58* (2006.01)
*C04B 35/628* (2006.01)

(52) U.S. Cl.
CPC .............. *C04B 35/62802* (2013.01); *C04B 2235/6562* (2013.01); *C04B 2235/6567* (2013.01); *C04B 2235/661* (2013.01); *C04B 2235/786* (2013.01); *C04B 2235/96* (2013.01)

(56) References Cited

U.S. PATENT DOCUMENTS 11,634,364 B2 * 4/2023 Park .................. C04B 35/645
501/93
2021/0269364 A1 * 9/2021 Park .................. C04B 35/6261

FOREIGN PATENT DOCUMENTS

| CN | 108751997 | A | 11/2018 |
| CN | 110128146 | A | 8/2019 |
| CN | 111484331 | A | 8/2020 |
| CN | 111533560 | A | 8/2020 |
| CN | 113387704 | A | 9/2021 |
| EP | 0243963 | A2 | 11/1987 |

OTHER PUBLICATIONS

Kiaonan Wang et al., "Research Progress of B4C-TiB2 Composite Ceramics", Journal of Ceramics, vol. 41 No. 6, Dec. 2020, Entire document.

Ji Wang et al., "Initial investigation of B4C-TiB2 composites as neutron absorption material for nuclear reactors", Journal of Nuclear Materials, 2020, Entire document.

Zetan Liu, "Preparation and properties of B4C-TiB2 composite ceramics", Chinese Excellent Master's dissertation Full-text Database Engineering Science and Technology I series, 2018, Entire document.

Weixiao Cao, "Preparation and Properties of B4C Reinforced TiB2 based Ceramic Composites", Chinese Excellent Master's dissertation Full-text Database Engineering Science and Technology I series, 2018, Entire document.

Songlin Ran et al., "Research Progress of B4C-TiB2 Composite Ceramics", Journal of Synthetic Crystals, Oct. 2013, vol. 42, No. 10, Entire document.

Jilin Hu et al., "Research Progress of SiC Matrix Composites Reinforced by TiB2", Journal of Synthetic Crystals, Nov. 2013, vol. 42, No. 11, Entire document.

* cited by examiner

ELECTRO-CONDUCTIVE $B_4C$-$TiB_2$ COMPOSITE CERAMIC AND PREPARATION METHOD THEREOF

CROSS-REFERENCE TO RELATED APPLICATIONS

This application claims the benefit of priority from Chinese Patent Application No. 202210485924.X, filed on May 6, 2022. The content of the aforementioned application, including any intervening amendments thereto, is incorporated herein by reference in its entirety.

TECHNICAL FIELD

This application relates to ceramic materials, and more particularly to an electro-conductive $B_4C$—$TiB_2$ composite ceramic and a preparation method thereof.

BACKGROUND $B_4C$ has been widely used in bulletproof armor, wear-resistant devices, aerospace and nuclear industries because of its high hardness, low density, good chemical stability, and large neutron-absorption cross section. Due to the presence of covalent bonds, $B_4C$ has poor sintering performance, which makes it difficult to achieve densification. Furthermore, the low fracture toughness of monolithic $B_4C$ ceramic leads to poor machining efficiency and accuracy and high cost, which limit the application of the monolithic $B_4C$ ceramic.

The introduction of a second phase $TiB_2$ into the $B_4C$ matrix to form $B_4C$—$TiB_2$ composite ceramics can not only significantly improve the sintering performance and mechanical properties of $B_4C$ ceramics, but also greatly reduce the electrical resistivity thereby meeting the requirements of electrical discharge machining (EDM). Usually, a material with lower electrical resistivity is more suitable for the EDM processing. Therefore, a key to improving the EDM processing performance of $B_4C$—$TiB_2$ composite ceramics is reducing the electrical resistivity. The most effective way to reduce the electrical resistivity is increasing the conductive phase content in composite ceramics. However, the increased content of $TiB_2$ conductive phase in the $B_4C$—$TiB_2$ composite ceramics will bring the following problems: (1) increasing the overall density of the composite ceramics (the density of $TiB_2$ is about 1.8 times that of $B_4C$); (2) reducing the hardness of composite ceramics (the hardness of $TiB_2$ is lower than that of $B_4C$); and (3) increasing the raw material cost. The above problems limit the application of $B_4C$—$TiB_2$ composite ceramic in lightweight armor. In conventional methods, a lower electrical resistivity of $B_4C$—$TiB_2$ composite ceramics is achieved mainly at the expense of other properties or cost.

SUMMARY

In view of the deficiencies in the prior art, this application provides an electro-conductive $B_4C$—$TiB_2$ composite ceramic having a high electrical conductivity at low $TiB_2$ content and a preparation method thereof In the microstructure of the $B_4C$—$TiB_2$ composite ceramic provided herein, the large $B_4C$ grains are coated by small $TiB_2$ grains.

Technical solutions of this application are described as follows.

In a first aspect, this application provides an electro-conductive $B_4C$—$TiB_2$ composite ceramic, wherein the electro-conductive $B_4C$—$TiB_2$ composite ceramic has a microstructure in which $B_4C$ grains are coated by $TiB_2$ grains; a grain size of the $B_4C$ grains is much larger than that of the $TiB_2$ grains; and a $TiB_2$ volume percentage in the electro-conductive $B_4C$—$TiB_2$ composite ceramic is 10~30%;

wherein the electro-conductive $B_4C$—$TiB_2$ composite ceramic is prepared through steps of:
(1) weighing a $B_4C$ powder, a TiC powder, and an amorphous B powder according to a preset weight ratio;
wherein a particle size of the $B_4C$ powder is 3.0~20.0 µm; a particle size of the TiC powder is 0.05~3.0 µm; a particle size of the amorphous B powder is 0.5~1.0 µm; a molar ratio of TiC to B is 1:6.6; and a weight ratio of the $B_4C$ powder to the TiC powder to the amorphous B powder is 21-69:14-36:16-43;
(2) mixing the $B_4C$ powder, the TiC powder and the amorphous B powder evenly followed by drying to obtain a mixed powder; and
(3) loading the mixed powder into a graphite mold; and transferring the graphite mold to a spark plasma sintering (SPS) furnace followed by sintering under vacuum.

In a second aspect, this application further provides a method for preparing the electro-conductive $B_4C$—$TiB_2$ composite ceramic, including:
(1) weighing a $B_4C$ powder, a TiC powder, and an amorphous B powder according to a preset weight ratio;
wherein a particle size of the $B_4C$ powder is 3.0~20.0 µm; a particle size of the TiC powder is 0.05~3.0 µm; and a particle size of the amorphous B powder is 0.5~1.0 µm; a molar ratio of TiC to B is 1:6.6; and a weight ratio of the $B_4C$ powder to the TiC powder to the amorphous B powder is 21-69:14-36:16-43;
(2) mixing the $B_4C$ powder, the TiC powder and the amorphous B powder evenly followed by drying to obtain a mixed powder; and
(3) loading the mixed powder into a graphite mold; and transferring the graphite mold to a spark plasma sintering (SPS) furnace followed by sintering under vacuum.

In an embodiment, the sintering is performed at 2000° C. and 50 MPa for 5~20 min.

Compared to the prior art, this application has the following beneficial effects.
(1) A microstructure, in which the large $B_4C$ grains are coated by the small $TiB_2$ grains, is constructed, which is conducive to the formation and improvement of the electro-conductive network.
(2) The spark plasma sintering (SPS) technology can effectively inhibit the growth of $TiB_2$ grains, which is conducive to improving the electrical properties of the $B_4C$—$TiB_2$ composite ceramic.
(3) In the case of the same $TiB_2$ content, the $B_4C$—$TiB_2$ composite ceramic prepared herein has higher electrical conductivity.
(4) In the case of the same resistivity, the $B_4C$—$TiB_2$ composite ceramic provided herein has lower $TiB_2$ content.
(5) The larger the particle size of $B_4C$, the higher the conductivity of the composite ceramic, which helps to reduce the cost of raw materials.

(6) Compared with the traditional method, the mechanical properties of the $B_4C$—$TiB_2$ composite ceramic prepared in the present application are comparable or better.
(7) The preparation process of the present application is simple, including only mixing and sintering of raw powders, without any complex operations.

DETAILED DESCRIPTION OF EMBODIMENTS

The technical solutions of the present disclosure will be further described in detail below in conjunction with the accompanying drawings and embodiments, but the embodiments below are not intended to limit the disclosure.

Example 1

5.03 g of $B_4C$ powder with a particle size of 10.3 μm, 1.83 g of TiC powder with a particle size of 0.05 and 2.19 g of amorphous B powder with a particle size of 0.9 μm were weighed, mixed uniformly, and dried to obtain a mixed powder. The mixed powder was loaded into a graphite mold, subjected to sintering in a spark plasma sintering furnace under vacuum at 2000° C. and 50 MPa for 16 min, and cooled naturally to obtain an electro-conductive $B_4C$-15 vol % $TiB_2$ composite ceramic. As demonstrated by the performance test, the prepared $B_4C$-15 vol % $TiB_2$ composite ceramic had a relative density of 98.7%, a three-point flexural strength of 676 MPa, a Vickers hardness of 29.0 GPa, a fracture toughness of 5.3 MPa·m$^{1/2}$, and an electrical conductivity of $2.8 \times 10^4$ S/m.

A $B_4C$-15 vol % $TiB_2$ composite ceramic prepared from 10.3 μm $B_4C$ powder and 2.5 μm $TiB_2$ powder through the same mixing and sintering process was used as comparison. As demonstrated by the performance test, the obtained $B_4C$-15 vol % $TiB_2$ composite ceramic had a relative density of 95.3%, a three-point flexural strength of 552 MPa, a Vickers hardness of 27.5 GPa, a fracture toughness of 4.4 MPa·m$^{1/2}$, and an electrical conductivity of $4.3 \times 10^3$ S/m.

Figure 1:
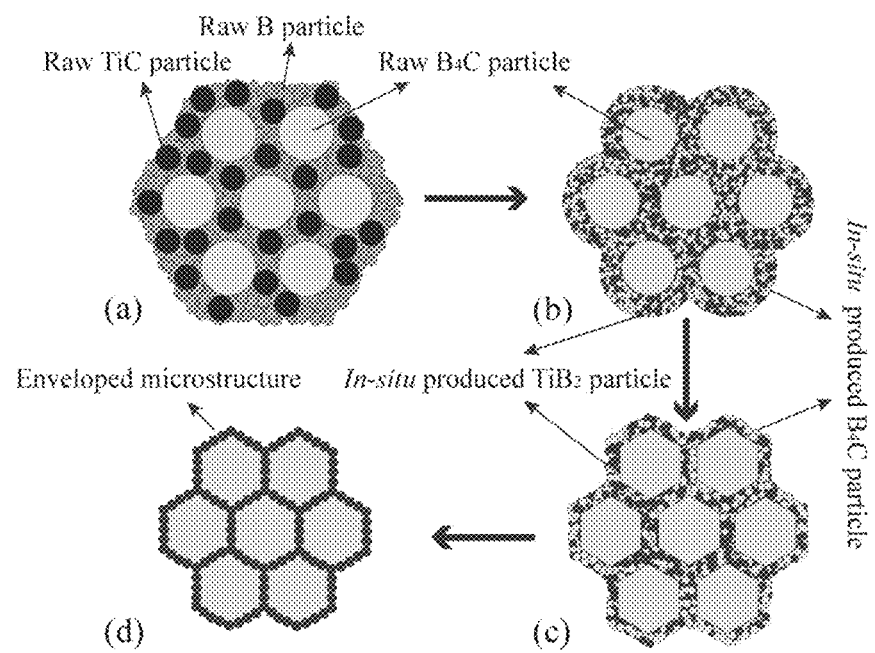
FIG. 1 schematically shows a fabrication principle of an electro-conductive $B_4C$—$TiB_2$ composite ceramic according to an embodiment of the present disclosure.

FIG. 1 illustrated the construction of the $B_4C$—$TiB_2$ composite ceramic of the present disclosure, where (a) mixing of raw materials $B_4C$, TiC, and B powder; (b) during the sintering process, TiC and B first underwent an in-situ reaction to form $B_4C$—$TiB_2$ ultrafine composite powder; (c) large $B_4C$ particles selectively absorbed ultrafine $B_4C$ particles in the $B_4C$—$TiB_2$ composite powder to experience grain growth; and (d) small $TiB_2$ grains are distributed around the large $B_4C$ grains to form an enveloped microstructure.

Figure 2A:
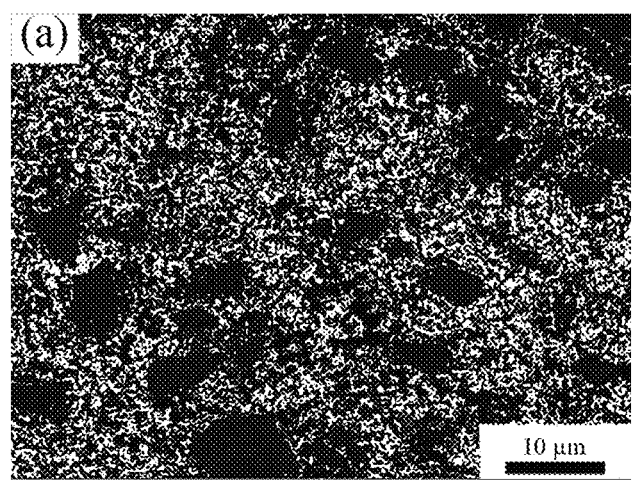
FIGS. 2a-2c show microstructure changes of a polished surface of a $B_4C$—$TiB_2$ composite ceramic prepared in Example 1 of the present disclosure.
Figure 2B:
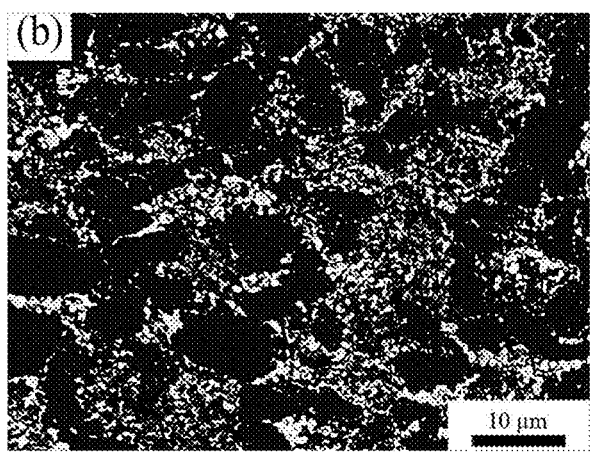
Figure 2C:
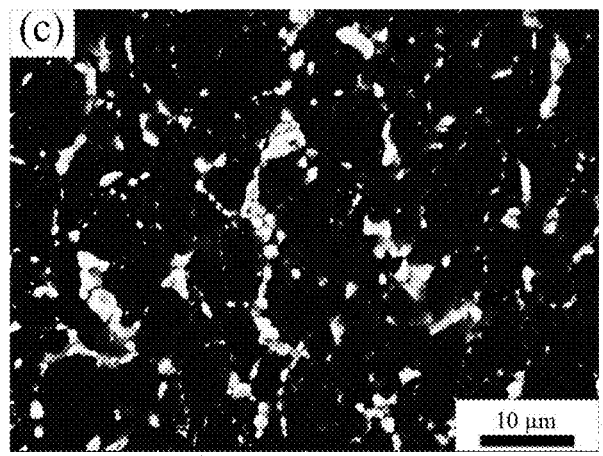

FIGS. 2a-2c show microstructure change of the polished surface of the $B_4C$—$TiB_2$ composite ceramic prepared in Example 1, where FIG. 2a: in the early stage of the sintering process, the large $B_4C$ particles and the in-situ formed $B_4C$—$TiB_2$ ultrafine composite powder coexisted; FIG. 2b: with the extension of the sintering time, the large $B_4C$ particles selectively absorbed the ultrafine $B_4C$ particles in the $B_4C$—$TiB_2$ composite powder to experience grain growth; and FIG. 2c: after holding for a certain time, the ultrafine $B_4C$ particles in the $B_4C$—$TiB_2$ composite powder were completely absorbed by the large $B_4C$ particles, and the small $TiB_2$ grains are distributed around the large $B_4C$ grains to form an enveloped microstructure. During this process, $TiB_2$ also underwent grain growth. However, due to the small initial grain size and limited growth, the $TiB_2$ grain was still much smaller relative to the $B_4C$ grain.

Figure 3:
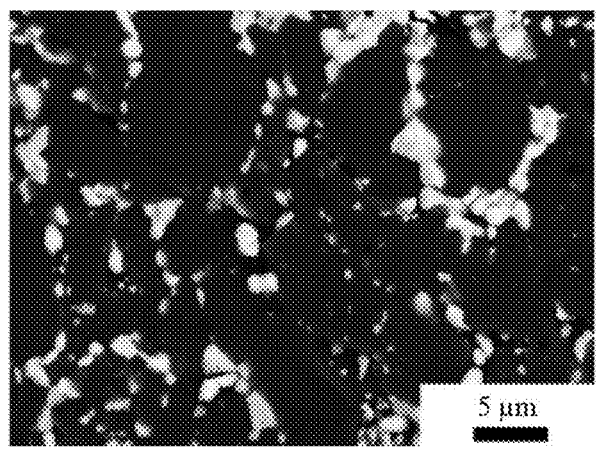
FIG. 3 is a microstructure diagram of a fracture surface of the $B_4C$—$TiB_2$ composite ceramic prepared in Example 1 of the present disclosure.

As shown in FIG. 3, the small $TiB_2$ grains were distributed around the large $B_4C$ grains.

Example 2

5.99 g of $B_4C$ powder with a particle size of 3.1 μm, 1.22 g of TiC powder with a particle size of 0.8 μm, and 1.46 g of amorphous B powder with a particle size of 0.9 μm were weighed, mixed uniformly, and dried to obtain a mixed powder. The mixed powder was loaded into a graphite mold, subjected to sintering in a spark plasma sintering furnace under vacuum at 2000° C. and 50 MPa for 16 min, and cooled naturally to obtain an electro-conductive $B_4C$-15 vol % $TiB_2$ composite ceramic. As demonstrated by the performance test, the prepared $B_4C$-15 vol % $TiB_2$ composite ceramic had a relative density of 99.5%, a three-point flexural strength of 780 MPa, a Vickers hardness of 31.8 GPa, a fracture toughness of 5.8 MPa·m$^{1/2}$, and an electrical conductivity of $3.3 \times 10^3$ S/m.

$B_4C$-15 vol % $TiB_2$ composite ceramic prepared from 3.1 μm $B_4C$ powder and 2.5 μm $TiB_2$ powder through the same mixing and sintering method was used as comparison. As demonstrated by the performance test, the obtained $B_4C$-15 vol % $TiB_2$ composite ceramic had a relative density of 98.65%, a three-point flexural strength of 638 MPa, a Vickers hardness of 29.2 GPa, a fracture toughness of 4.9 MPa·m$^{1/2}$, and an electrical conductivity of $2.1 \times 10^3$ S/m.

Example 3

4.07 g of $B_4C$ powder with a particle size of 10.3 μm, 2.45 g of TiC powder with a particle size of 0.8 and 2.91 g of amorphous B powder with a particle size of 0.9 μm were weighed, mixed uniformly, and dried to obtain a mixed powder. The mixed powder was loaded into a graphite mold, subjected to sintering in a spark plasma sintering furnace under vacuum at 2000° C. and 50 MPa for 16 min, and cooled naturally to obtain an electro-conductive $B_4C$-20 vol % $TiB_2$ composite ceramics. As demonstrated by the performance test, the prepared $B_4C$-20 vol % $TiB_2$ composite ceramic had a relative density of 98.1%, a three-point flexural strength of 701 MPa, a Vickers hardness of 28.5 GPa, a fracture toughness of 6.2 MPa·m$^{1/2}$, and an electrical conductivity of $6.9 \times 10^4$ S/m.

$B_4C$-20 vol % $TiB_2$ composite ceramic prepared from 10.3 μm $B_4C$ powder and 2.50 μm $TiB_2$ powder by the same mixing and sintering method was used as comparison. As demonstrated by the performance test the obtained $B_4C$-20 vol % $TiB_2$ composite ceramic had a relative density of 93.5%, a three-point flexural strength of 587 MPa, a Vickers hardness of 27.6 GPa, a fracture toughness of 5.1 MPa·m$^{1/2}$, and an electrical conductivity of $1.6 \times 10^4$ S/m.

What is claimed is:
1. A method for preparing an electro-conductive $B_4C$—$TiB_2$ composite ceramic, comprising:

mixing a $B_4C$ powder, a TiC powder and an amorphous B powder according to a preset weight ratio to produce a powder mixture;
wherein a particle size of the $B_4C$ powder is 3.0~20.0 μm; a particle size of the TiC powder is 0.05~3.0 μm; and a particle size of the amorphous B powder is 0.5~1.0 μm;
drying the powder mixture;
loading dried powder mixture into a graphite mold; and
transferring the graphite mold to a spark plasma sintering (SPS) furnace followed by sintering under vacuum.

2. The method of claim 1, wherein the sintering is performed at 2000° C. and 50 MPa for 5~20 min.

3. The method of claim 1, wherein a molar ratio of TiC to B is 1:6.6; and a weight ratio of the $B_4C$ powder to the TiC powder to the amorphous B powder is 21-69:14-36:16-43.

* * * * *